United States Patent [19]
Weatherston

[11] 3,709,289
[45] Jan. 9, 1973

[54] HEATING AND COOLING CONTROL SYSTEM
[75] Inventor: Richard N. Weatherston, Saint Paul, Minn.
[73] Assignee: Weather-Rite, Inc., St. Paul, Minn.
[22] Filed: March 30, 1971
[21] Appl. No.: 129,506

[52] U.S. Cl.....................................165/12, 161/26
[51] Int. Cl..............................................F25b 29/00
[58] Field of Search..................165/12, 26, 27, 28, 22

[56] References Cited
UNITED STATES PATENTS 3,305,000  2/1967  Bullen et al. ............................165/12
3,645,697  2/1972  Huffman, Jr. ...........................165/12

Primary Examiner—Charles Sukalo
Attorney—Robert M. Dunning

[57] ABSTRACT

A control system for a heating and cooling system in which the amount of heating and the amount of cooling are changed in incremental stages in response to a signal received at timed intervals from an electronic clock. A proportional thermostat calls for either heating or cooling and also controls the rate of the electronic clock.

7 Claims, 1 Drawing Figure

PATENTED JAN 9 1973
3,709,289
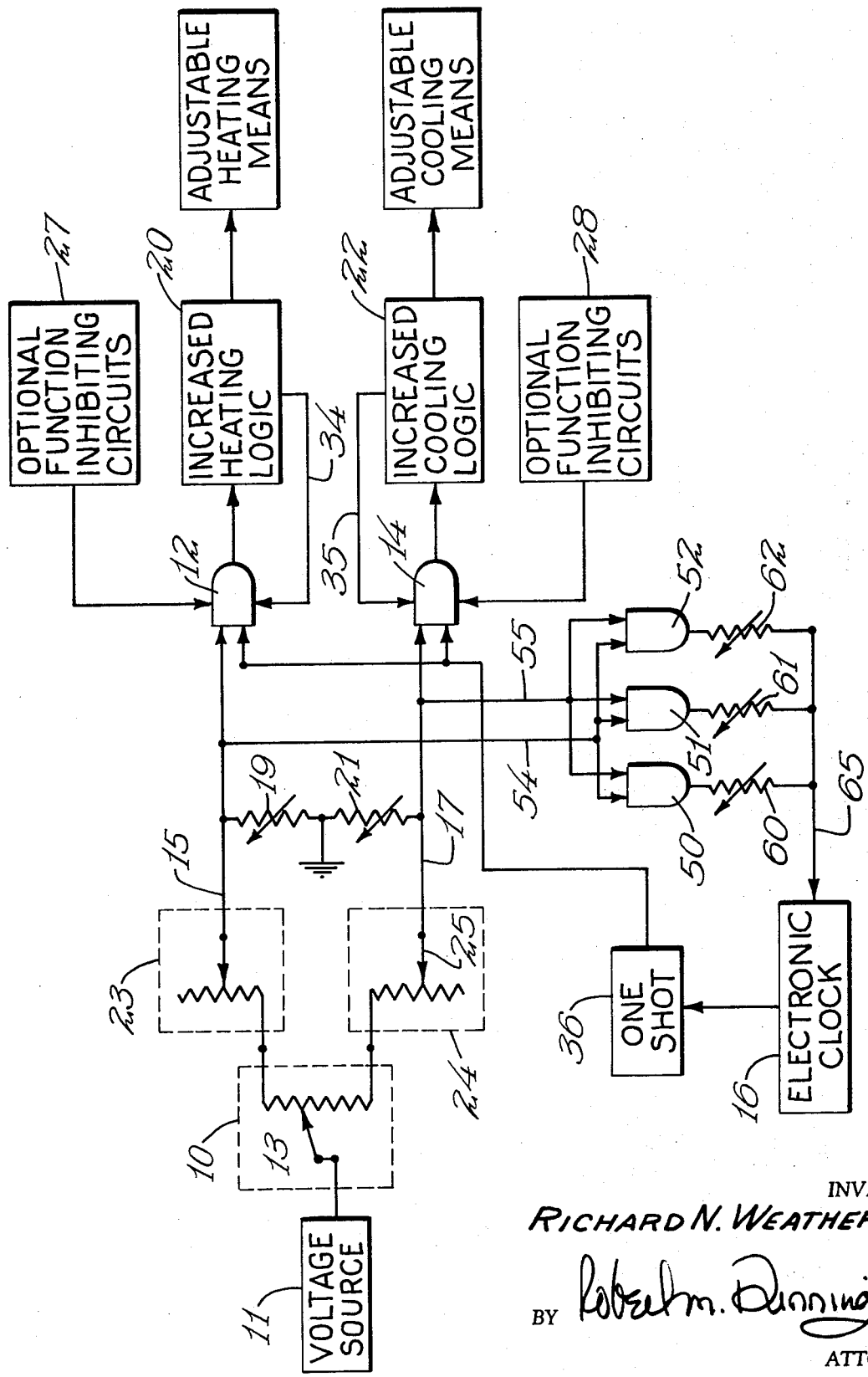
INVENTOR
RICHARD N. WEATHERSTON
BY Robert M. Dunning
ATTORNEY

HEATING AND COOLING CONTROL SYSTEM

BACKGROUND OF THE INVENTION

In the prior art many control systems have been used for keeping certain controllable factors at a predetermined level. Things that have been controlled include room temperature, water level, pressure, speed and mixtures. Of particular interest in this application is the control of room temperature by heating, air conditioning, or the supplying of outside air to the room. Prior art systems have generally relied upon simple thermostats which can call for either heating or cooling. Systems of this type are not capable of adjusting quickly to changes in heating and cooling requirements because they must be designed to respond slowly. If they are designed to respond quickly they tend to overshoot the predetermined temperature level causing severe oscillations about the desired temperature. Thus, prior art heating and cooling systems have been designed to respond rather slowly to changing temperatures in order to avoid at least partially this oscillation problem.

To improve upon the above described art one system contemplates controlling the heating and the cooling in a plurality of stages each of which may be separately adjusted. As the thermostat calls for more heating or cooling this new type of system progresses incrementally from one stage to the next at a regular rate in accordance with an electronic clock which provides a periodic signal allowing a periodic shift. Such a system is disclosed in my copending patent application Ser. No. 110,526 filed Jan. 28, 1971 in the name of the present inventor and titled "Staged Heating and Cooling System." The present invention provides an improvement over the invention of my above referenced copending patent application by providing a thermostat that can have a null position and by permitting the clock rate to be adjusted in response to the difference between the desired temperature and the actual temperature. Thus, the present invention permits the system to accelerate its response to temperature changes automatically.

SUMMARY OF THE INVENTION

Briefly, my invention operates by employing a proportional thermostat which generates a voltage proportional to the difference between the desired temperature and the actual temperature. Such thermostats are well known in the prior art and constitute a significant improvement over the simpler type of thermostat which provides only a signal calling for either more or less heat. The signal from the proportional thermostat is used to call for more heating or more cooling in much the same manner as described in my copending patent application referenced above. However, the proportional output of the thermostat inherently includes a certain null region in which neither heating or cooling are called for. This region arises because the system cannot respond unless the voltage from the thermostat is above a certain minimum threshold level. Thus, the present invention permits a situation in which neither heating nor cooling are called for.

Another advantage of the present system derives from an arrangement wherein gates are connected across the output of the proportional thermostat which are designed to switch on in response to a sufficient differential in voltage therefrom representing a sufficient differential between the desired temperature and the actual temperature. The signal from the gates is used to accelerate the electronic clock which is used to periodically shift the heating or cooling systems upward or downward in response to the thermostat instruction. Consequently, if there is a large deviation between the actual temperature and the desired temperature the present control system responds more quickly than in the case where there is only a small deviation of temperature. Thus, it may be seen that it is an object of my invention to provide an improved control system. It is a further object of the present invention to provide a low cost solid state electronic control system which does not oscillate about the desired level if there are time lags in the sensing system but which can automatically change quite quickly if necessary. Further objects and advantages will become apparent upon consideration of the following description and drawings.

BRIEF DESCRIPTION OF THE DRAWINGS

The drawing comprises a schematic electronic circuit showing how the proportional thermostat operates and how signals are derived from the thermostat to accelerate the electronic clock and call for more or less heating and cooling.

DESCRIPTION OF THE PREFERRED EMBODIMENT

Referring to the drawing a proportional thermostat 10 is shown which transmits a signal from a voltage source 11 to a pair of gates 12 and 14. If the signal is presented to gate 12 increased heating is necessary while if the signal is presented to gate 14 increased cooling is necessary. Gates 12 and 14 open periodically in response to a signal from an electronic clock 16 allowing any signal from the thermostat above a predetermined threshold voltage to pass through and call for more heating or more cooling. If a signal from the thermostat is present on line 15 gate 12 passes that signal to heating logic 20. A signal on line 17 is passed to cooling logic 22. Heating and cooling logic 20 and 22 comprise an up-down electronic counter in the above referenced copending application which activates successively more stages of heating or cooling. However, the operation of this logic circuitry and the details of the overall system described to this point are discussed in detail in the above referenced copending application and are therefore omitted here.

Considering only the details of the improvement invention disclosed herein voltage source 11 supplies voltage through a potentiometer type wiper arm 13. Wiper arm 13 comprises a portion of the thermostat 10 and is connected, for example, to a bi-metal spring so as to move in response to the temperature of the room. Such thermostats are well known in the art. If the wiper arm moves upward more current flows to lead 15 while if the wiper arm 13 moved downward more current flows through lead 17 to gate 14. Gates 12 and 14 which may comprise, for example, Schmitt triggers, are designed to respond only to a certain minimum threshold voltage signal which threshold can be adjusted by means of a pair of variable resistances 19 and 21. If wiper arm 13 is directly centered in thermostat 10 as in the case when the temperature is approximately at the desired level there are equal voltage signals at both gates 12 and 14. Variable resistances 19 and 21 are initially adjusted to make these voltages lie below the gate triggering levels. Small deviations in temperature do not move wiper arm 13 far enough to generate enough voltage increase on either line 15 or line 17 to trigger gates 12 or 14. In this state neither increased heating nor increased cooling are called for and the status quo situation is maintained. However, larger deviations in temperature will produce enough voltage to open the gates and activate the logic circuits 20 and 22.

A pair of additional limit thermostats 23 and 24 are positioned in series in lines 15 and 17 respectively. Limit thermostats 23 and 24 are exemplary only and represent possible modifications not essential to the present invention. There are some circumstances in which a great deal of cooling will be called for due to a very warm building so that an air conditioning system may provide a great deal of cold air through a particular piece of duct work. Although it will take some time for the building itself to cool down this duct work might reach an abnormally low temperature causing damage to nearby equipment. In such an event, limit thermostat 24 could be installed in this duct and designed to operate in much the same way as thermostat 10 with a wiper arm 25 moving in response to temperature. If the temperature is too low, limit thermostat 24 is designed to provide such a radical change in resistance that despite the position of wiper arm 13 and the unbalance of the bridge circuit of thermostat 10 the signal will actually be increased on line 15 rather than line 17 so that the entire overall system will start to call for increased heating rather than continuing to call for cooling. A similar heating limit thermostat 23 could also be installed in the duct work to sense temperatures that are too high.

Returning to the main invention, electronic clock 16 produces a series of regularly spaced short pulses on line 40 which activate a one-shot multivibrator circuit 36. One-shot 36 triggers pulses which are presented to gates 12 and 14 to provide the incremental or timed clock signals discussed earlier. Every time a clock pulse is received by gates 12 and 14 one of them is activated if there is a signal on line 15 or 17 to call for more heating or more cooling. The activation of the heating and cooling equipment is described in detail in my copending patent application mentioned above.

In the event either of the logic circuits 20 or 22 has reached the end of its travels, i.e., the up-counter is at the end of the count, the maximum heating or cooling signal is also used to feed back to gates 12 and 14 through lines 34 and 35 respectively where it is used to inhibit the action of gates 12 or 14 so as to prevent the system from rolling over (i.e. counting to the maximum count in one direction and returning to the beginning). Thus, for example if more cooling is called for but cooling logic 22 has reached its maximum capability gate 14 will automatically be inhibited from driving logic 22 any further.

Actually any of a number of external factors may be suitable for using to inhibit the gates. Thus two optional function inhibiting circuits 27 and 28 are shown which are connected to inhibit gates 12 and 14 in response to any chosen outside condition. In the preferred embodiment circuit 28 could comprise an outdoors thermostat that limits the degree of cooling called for when the outside temperature is below a predetermined level. Thus, if the cooling system relies in part on the use of outside air the gates and logic are inhibited whenever circuit 28 senses that outside air alone is sufficient to provide cooling.

It is desirable to be able to accelerate or deaccelerate electronic clock 16 in order to change the heating or cooling faster in response to sudden large demands as called for by thermostat 10. In my prior copending application I mentioned that this could be done manually. However, it is more preferable that it be done automatically and the present invention accomplishes this end by the use of three gates 50, 51 and 52 which are all connected to leads 15 and 17 by means of a pair of leads 54 and 55. Returning again to thermostat 10 it should be noted that as potentiometer arm 13 moves the voltage will drop on one lead and increase on the other lead. Thus, the difference in voltage between the two leads is indicative of the amount of displacement in either direction of wiper arm 13. Gates 50, 51 and 52 are all designed to have different threshold values so as to turn on in response to this difference voltage as presented on line 54 and 55. If for example, gate 50 has the lowest threshold, it turns on first in response to a certain voltage difference on lines 54 and 55. As the voltage difference increases the next most sensitive gate, which could be gate 51, also turns on and for enough of a voltage difference gate 52 joins the other two gates and they all are on simultaneously. A set of three variable resistances 60, 61 and 62 permit the current flow from gates 50 through 52 to be adjusted to suitable values. The current is combined and directed on a lead 65 to electronic clock 16 so as to increase the clock rate. It may be seen that the greater the deviation between the desired temperature and the actual temperature the more the difference in voltage results in the opening of more gates to provide more current to effect a greater increase in the clock rate thus allowing the system to adjust at a faster rate.

It should be understood that a number of variations may be made to the present apparatus without departing from the spirit and scope of the invention. For example, gates 50 through 52 could be designed to come on one at a time each one producing a different clock rate. Various other types of proportional thermostats could be substituted for the simple type described herein which has been shown only as an example. Thus, the following claims are intended to cover the broad patentable aspects of the present control system only and not be limited to the particular embodiment shown in the drawing.

I claim:

1. A control system for a heating and cooling system comprising in combination;
   incrementally adjustable heating and cooling means;
   first and second logic means connected to said adjustable heating and cooling means respectively both operable when activated to call for incrementally more heat and incrementally more cooling;
   a proportional thermostat connected to said first and second logic means operable to select between said first and second logic means to produce more heating or more cooling;

an electronic clock connected to said logic means operable to activate the logic means at periodic intervals;

an electronic feedback means connecting said thermostat and said electronic clock operable to accelerate said electronic clock in response to a greater differential between the signals to said first and second logic means from said thermostat which differential represents the difference between the actual temperature and the desired temperature.

2. The apparatus of claim 1 wherein the signals from said thermostat comprise voltages produced by a temperature varied bridge circuit.

3. The apparatus of claim 2 in which said feedback means comprises electronic gates connected to receive the voltage signals from said thermostat and accelerate said clock in response to predetermined differentials between said voltages.

4. The apparatus of claim 3 including means to inhibit said logic means from calling for more heating when maximum heating is being applied.

5. The apparatus of claim 3 including means to inhibit said logic means from calling for more cooling when maximum cooling is being applied.

6. The apparatus of claim 3 including means to inhibit said logic means from calling for more heating in response to a predetermined external condition.

7. The apparatus of claim 3 including means to inhibit said logic means from calling for more cooling in response to a predetermined external condition.

* * * * *